United States Patent
Hsieh et al.

(10) Patent No.: US 7,602,383 B2
(45) Date of Patent: Oct. 13, 2009

(54) TOUCH SENSING APPARATUS WITH DIFFERENTIAL SIGNAL SOURCE

(75) Inventors: Kuan-Hong Hsieh, Guangdong (CN); Shi-Quan Lin, Guangdong (CN); Han-Che Wang, Guangdong (CN); Xiao-Guang Li, Guangdong (CN)

(73) Assignees: Hong Fu Jin Precision Industry (Shen Zhen) Co., Ltd., Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 620 days.

(21) Appl. No.: 11/307,099

(22) Filed: Jan. 23, 2006

(65) Prior Publication Data

US 2006/0227119 A1    Oct. 12, 2006

(30) Foreign Application Priority Data

Apr. 8, 2005    (CN) .................... 2005 1 0034111

(51) Int. Cl.
*G06F 3/041* (2006.01)
(52) U.S. Cl. .................. 345/173; 178/18.03; 178/18.04
(58) Field of Classification Search ......... 345/173–178; 178/18.03–18.11, 20.01; 73/514.16; 324/678; 250/215; 340/679
See application file for complete search history.

(56) References Cited

U.S. PATENT DOCUMENTS

| | | | | |
|---|---|---|---|---|
| 4,071,691 A | * | 1/1978 | Pepper, Jr. ............... | 178/18.05 |
| 4,707,845 A | * | 11/1987 | Krein et al. ............... | 178/20.01 |
| 5,495,077 A | | 2/1996 | Miller et al. | |
| 5,565,625 A | * | 10/1996 | Howe et al. ............... | 73/514.16 |
| 6,366,099 B1 | * | 4/2002 | Reddi ........................ | 324/678 |
| 6,534,970 B1 | | 3/2003 | Ely et al. | |
| 6,545,614 B1 | | 4/2003 | Kasai | |
| 6,737,981 B2 | * | 5/2004 | Hagemeister et al. ....... | 340/679 |
| 2004/0099794 A1 | * | 5/2004 | Kole .......................... | 250/215 |
| 2006/0033508 A1 | * | 2/2006 | Lee ............................ | 324/678 |

* cited by examiner

*Primary Examiner*—Amare Mengistu
*Assistant Examiner*—Premal Patel
(74) *Attorney, Agent, or Firm*—Winston Hsu

(57) ABSTRACT

A preferred embodiment of the touch sensing apparatus includes one or more touch sensing units, a detector, and a signal processing unit. Each touch sensing unit comprises: a differential signal source for generating two signals which have a same frequency but reverse phases; and two sensors for receiving a touch signal of a user's finger. One sensor is connected to an anode of the differential signal source, and the other sensor is connected to a cathode of the differential signal source. The detector is for converting the received signal into a digital signal. An input terminal of the detector is connected to the sensors of each touch sensing unit. The signal processing unit is for determining which sensor is touched according to the frequency and phase of the signal output from the detector. The signal processing unit is connected to an output terminal of the detector. The touch sensing unit may further include a reference signal circuit.

6 Claims, 4 Drawing Sheets

TOUCH SENSING APPARATUS WITH DIFFERENTIAL SIGNAL SOURCE

TECHNICAL FIELD

The present invention relates generally to touch sensing apparatuses such as those used in certain personal computers, and particularly to a touch sensing apparatus for determining which of sensors thereof is touched according to a frequency and a phase of an input signal.

DESCRIPTION OF RELATED ART

There are several available touch-sense technologies which may be employed for use as a position indicator in an apparatus such as a personal computer. Resistive-membrane position sensors are known and used in several applications. However, these sensors generally have poor resolution. In addition, the sensor surface is exposed to the user and is thus subject to wear. Further, resistive-membrane touch sensors are relatively expensive. A one-surface sensor configuration requires a user to be grounded relative to the sensor for reliable operation. This cannot be guaranteed in applications such as with portable computers. An example of a one-surface sensor configuration is the UnMouse product available from MicroTouch, of Wilmington, Mass.

A touch sensitive control device translates touch location into output signals. The device includes a substrate which supports first and second interleaved, closely spaced, non-overlapping arrays of conductive plates. An insulating layer overlies the first and second arrays so that when the outer surface of the insulating layer is touched, the capacitance of at least one of columns of the plates of the first array and at least one of rows of plates of the second array underlying the insulating layer at the location being touched exhibits a change of capacitance with respect to ambient ground. Based upon the measured capacitance of each column of the first array and row of the second array, a microcomputer produces output signals which represent the coordinates of the location being touched. These output signals can be used, for example, to control the position of a cursor on a display screen of a personal computer or to make selected function commands.

In a second kind of conventional apparatus, a tablet for sensing the position of a stylus is provided. The stylus alters the transcapacitance coupling between rows and columns of electrodes, which are scanned sequentially. In a third kind of conventional apparatus, a radial electrode arrangement is provided adjacent the space bar of a keyboard. The radial electrode arrangement is part of a trackball system, and can be activated by a user touching the trackball with his/her thumb. This third kind of apparatus employs the use of total touch capacitance as an indication of the touch pressure, in order to control the velocity of motion of a display screen cursor. Pulsed sequential polling is employed to address the effects of electrical interference.

FIG. 1 is a circuit diagram of a conventional touch sensing pad. The circuit includes a signal source 10, a plurality of sensors 11, a plurality of clamping circuits 12, a plurality of detectors 13, and a signal processing unit 14. The signal source 10 connects to all the sensors 11, one terminal of each clamping circuit 12 connects to a corresponding sensor 11, the other terminal of each clamping circuit 12 connects to the input of a corresponding detector 13, and the output of each detector 13 connects to the signal processing unit 14. The signal source 10 is for generating a constant frequency signal, and each sensor 11 is for receiving a signal generated by a touch on the sensing pad. Once one of the sensors 11 senses a signal generated by a touch on the sensing pad, the signal is transmitted to the corresponding detector 13 through the sensor 11, and the detector 13 converts the signal into a digital signal. The signal processing unit 14 scans all the detectors 13 at regular intervals. Thus the signal processing unit 14 can determine which sensor 11 is touched is according to which of the detectors 13 generates a digital signal.

The above conventional touch sensing pad uses a signal source 10 to provide the constant frequency signal. The constant frequency signal may cause Electro Magnetic Interference (EMI) and current leakage. In addition, each sensor 11 requires a corresponding detector 13, which makes the circuit unduly complex.

What is needed is a touch sensing apparatus having less complex circuitry, improved efficiency, improved sensing accuracy, less power consumption, and lower manufacturing costs.

SUMMARY

A touch sensing apparatus is provided. A preferred embodiment of the touch sensing apparatus includes one or more touch sensing units, a detector, and a signal processing unit. Each touch sensing unit comprises: a differential signal source for generating two signals which have a same frequency but reverse phases; and two sensors for receiving a touch signal of a user's finger. One sensor is connected to an anode of the differential signal source, and the other sensor is connected to a cathode of the differential signal source. The detector is for converting the received signal into a digital signal. An input terminal of the detector is connected to the sensors of each touch sensing unit. The signal processing unit is for determining which sensor is touched according to the frequency and phase of the signal output from the detector. The signal processing unit is connected to an output terminal of the detector. The touch sensing unit may further include a reference signal circuit.

Other advantages and novel features will be drawn from the following detailed description of exemplary embodiments with reference to the attached drawings, in which:

DETAILED DESCRIPTION OF THE PREFERRED EMBODIMENTS

Figure 1:
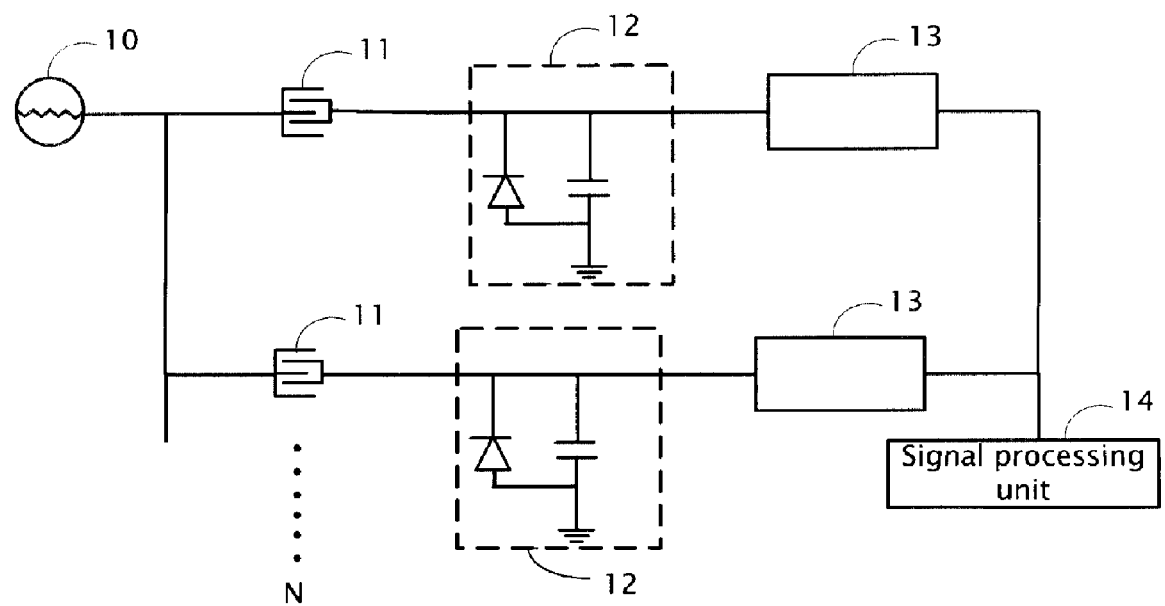
FIG. 1 is a circuit diagram of a conventional touch sensing pad.
Figure 2:
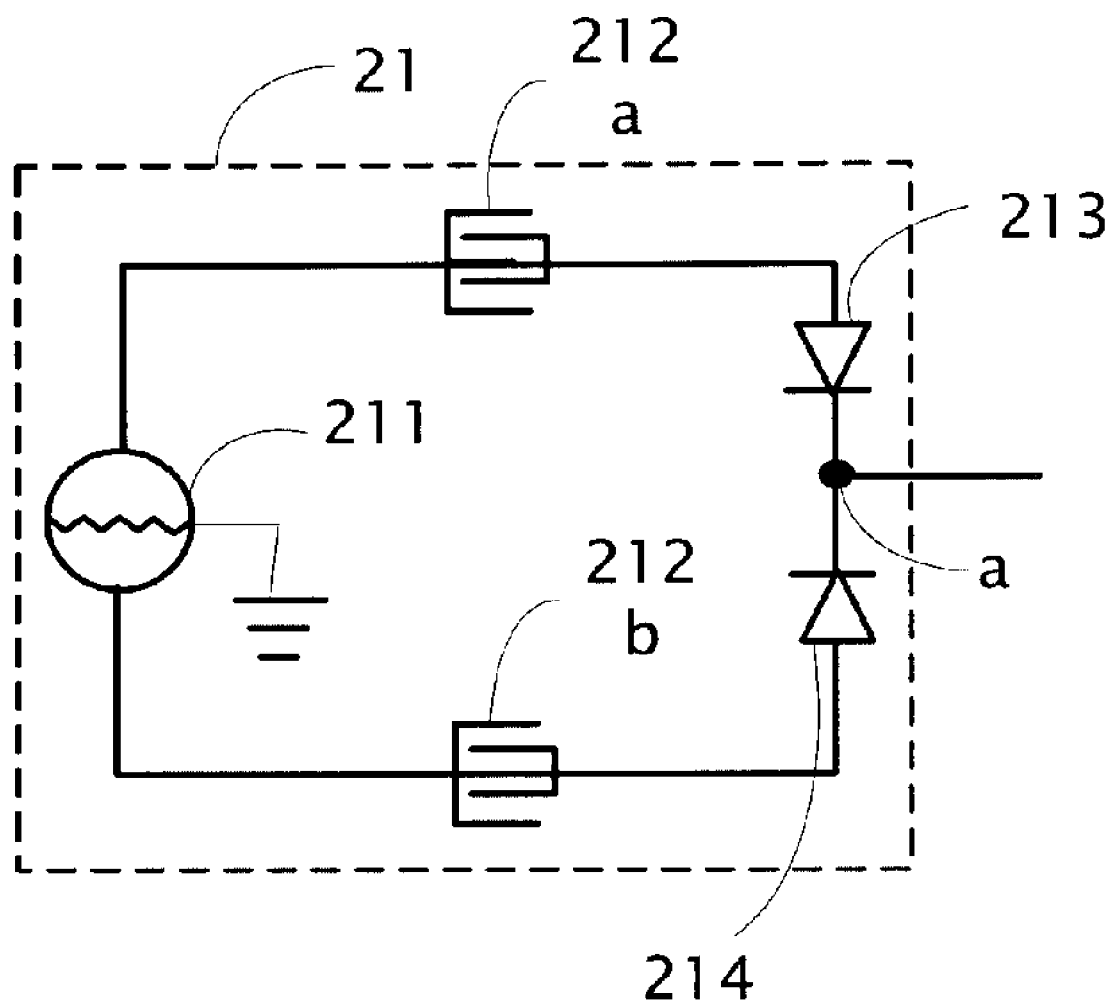
FIG. 2 is a circuit diagram of a touch sensing unit in accordance with a preferred embodiment of the present invention.

FIG. 2 is an exemplary circuit diagram of a touch sensing unit in accordance with a preferred embodiment of the present invention. The touch sensing unit 21 mainly includes a signal source 211, two sensors 212a, 212b each having two terminals, a first diode 213, and a second diode 214. The first and second diodes 213, 214 respectively possess an anode and a cathode. The signal source 211 possesses a first terminal and a second terminal. In the preferred embodiment, one of the first and second terminals also functions as an output terminal, for outputting a signal to a reference signal detector 30 (see FIG. 3). The signal source 211 is grounded. The first and second terminals of the signal source 211 are respectively connected with first terminals of the two sensors 212a, 212b. The anodes of the two diodes 213, 214 are respectively connected to second terminals of the two sensors 212a, 212b. Additionally, the cathodes of the two diodes 213, 214 are connected with each other, and have a node "a"; therebetween. Through the node "a"; and the output terminal of the signal source 211, the touch sensing unit 21 is connected to an external circuit (not shown). The external circuit may be a signal testing apparatus or a signal processing unit.

The signal source 211 is for generating two signals which have a same frequency but reverse polarities. Each of the sensors 212a, 212b acts as a dummy capacitor, and is formed from a non-contact conductor. For example, each sensor 212a, 212b can be a shunt capacitor. When not touched, a capacitance of each sensor 212a, 212b is low, and thus a signal voltage passing through the sensor 212a, 212b is lower than a threshold voltage (e.g., 0.7V) of the two diodes 213, 214. Consequently, there is almost no current flowing out from the node "a". On the other hand, when either of the sensors 212a, 212b is touched, due to a dielectric constant of the sensor 212a, 212b, the capacitance of the sensor 212a, 212b becomes high, and thus the signal voltage passing through the sensor 212a, 212b is higher than the threshold voltage of the two diodes 213, 214. Accordingly, current flows out from the node "a".

Figure 3:
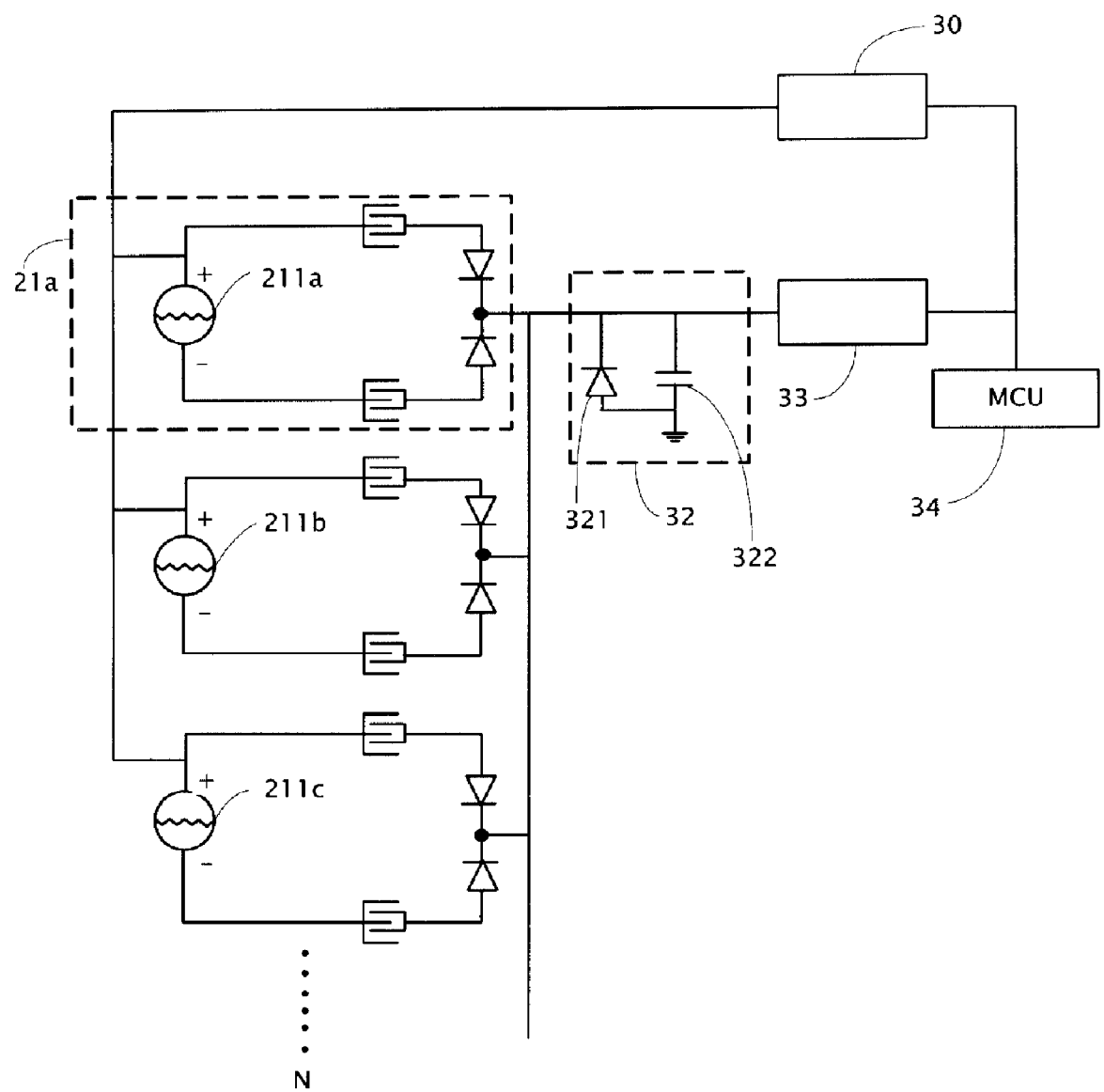
FIG. 3 is a circuit diagram of a touch sensing apparatus in accordance with a preferred embodiment of the present invention, the touch sensing apparatus including a plurality of the touch sensing units of FIG. 2.

FIG. 3 is a circuit diagram of a touch sensing apparatus (hereafter, er "the apparatus") in accordance with a preferred embodiment of the present invention. The apparatus includes a plurality of the above-described touch sensing units 21. In the preferred embodiment, the apparatus includes a reference signal detector 30, a plurality "N";) of touch sensing units 21, a clamping circuit 32, a detector 33, and a signal processing unit 34. For simplicity, in this exemplary embodiment, only three touch sensing units 21 are shown. The first of the touch sensing units 21 is designated as a touch sensing unit 21a. The output terminals of the signal sources 211a, 211b, 211c of the touch sensing units 21 are connected to an input terminal of the reference signal detector 30. Additionally, the nodes of the touch sensing units 21 are connected to one terminal of the clamping circuit 32. The clamping circuit 32 includes a diode 321 and a capacitor 322. A cathode of the diode 321, namely the one terminal of the clamping circuit 32, is connected to the nodes of the touch sensing units 21. An anode of the diode 321 is grounded. One end of the capacitor 322 is connected to an input terminal of the detector 33, and the other end of the capacitor 322 is grounded. Output terminals of the detector 33 and the reference signal detector 30 are connected to the signal processing unit 34. In the illustrated embodiment, the signal processing unit 34 is an MCU (Microprogrammed Control Unit). The detector 33 can be a high impedance input circuit.

In the illustrated embodiment, the first terminal of each signal source 211a, 211b, 211c is an anode, and the second terminal of each signal source 211a, 211b, 211c is a cathode. Thus, the anode of each signal source 211a, 211b, 211c also functions as the output terminal of the signal source 211a, 211b, 211c. Each signal source 211a, 211b, 211c is capable of generating a signals with an exclusive frequency, so that the signals generated by the signal sources 211a, 211b, 211c are all different from each other. A signal output from the anode of each signal source 211a, 211b, 211c follows two paths. One path is to the reference signal detector 30 through the output terminal of the signal source 211a, 211b, 211c, and the other path is to the sensor 212a connected with the anode. A signal output from the cathode of each signal source 211a, 211b, 211c flows to the other sensor 212b connected with the cathode. The reference signal detector 30 is for detecting the signals from the signal sources 211a, 211b, 211c, and outputting the signals as reference signals to the signal processing unit 34. Each sensor 212 is capable of transmitting a touch signal and a static electrical signal of a user to the clamping circuit 32 when touched by a user's finger. However, the static electrical signal may cause interference with the touch signal, and may even cause the detector 33 to break down. In addition, a strong touch signal may adversely influence a resultant output to the signal processing unit 34; that is, the sensitivity of the touch sensing unit 21 may be diminished. Accordingly, the clamping circuit 32 is provided for eliminating the static electrical signal and attenuating the touch signal, and thus improving the accuracy of the sensitivity of the touch sensing unit 21. Upon receiving the static electrical signal and the touch signal, the diode 321 filters out the static electrical signal to ground to prevent breakdown of the detector 33, attenuates the touch signal, and transmits the attenuated touch signal to the capacitor 322. The capacitor 322 leaks a portion of the attenuated touch signal through to ground. Thus the attenuated touch signal is further attenuated, thereby obtaining more accurate sensitivity. The detector 33 has a high input impedance so as to easily detect the further attenuated touch signal received from the input terminal of the detector 33. The detector 33 then converts the further attenuated touch signal into a digital signal, and transmits the digital signal through the output terminal of the detector 33 to the signal processing unit 34. Once it receives the reference signal from the reference signal detector 30 and the digital signal from the detector 33, the signal processing unit 34 compares the frequency and phase of the reference signal with those of the digital signal to determine which sensor 212 is touched.

Figure 4:
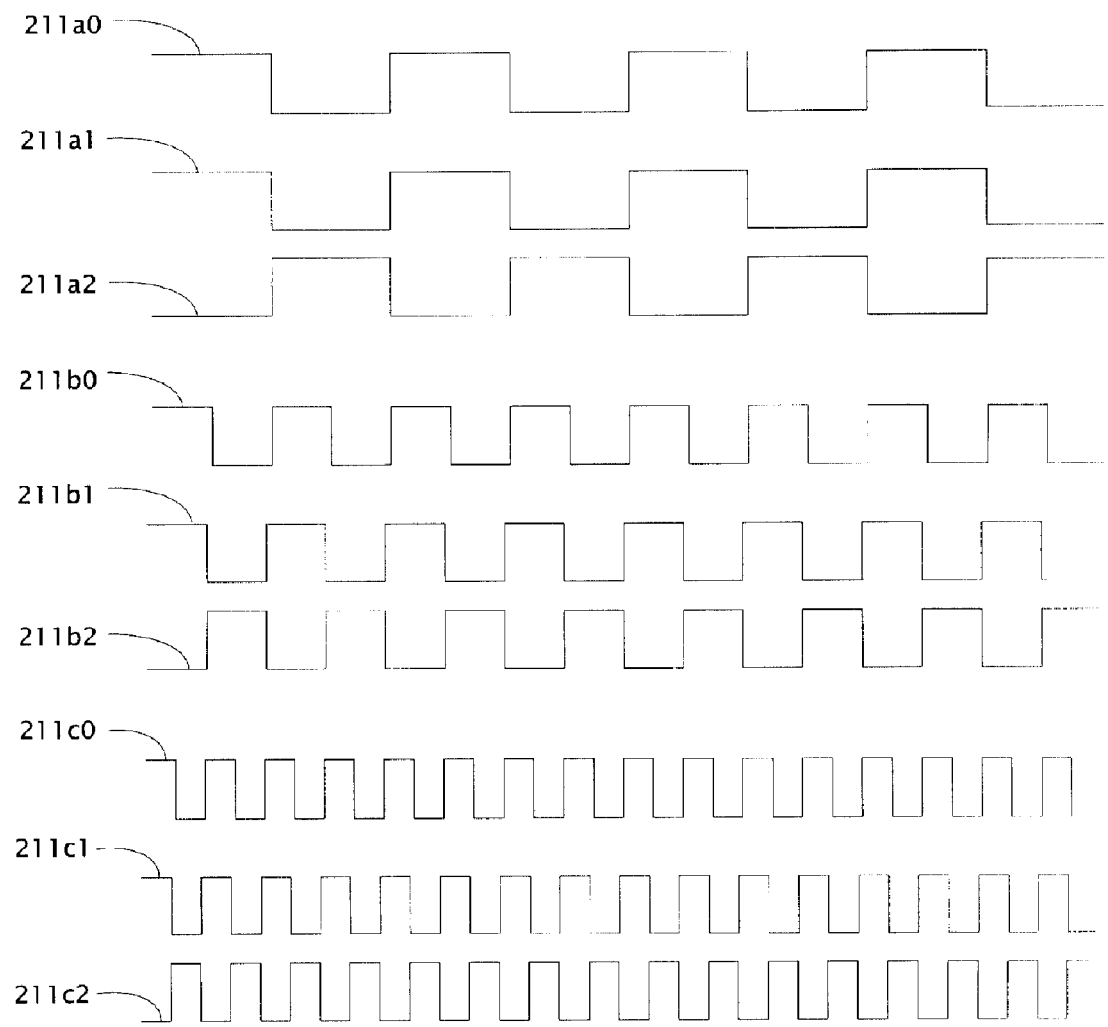
FIG. 4 is an output waveform diagram of each touch sensing unit of the touch sensing apparatus of FIG. 3.

FIG. 4 is an output waveform diagram of any one touch sensing unit 21 of the apparatus. As described above, each signal source 211a, 211b, 211c generates a signal with an exclusive frequency. Therefore, waveforms of the signals output from the output terminals of the different signal sources 211a, 211b, 211c are different from each other. These waveforms are designated as waveform 211a0, waveform 211b0, and waveform 211c0. Further, since each signal source 211a, 211b, 211c is itself a differential signal source, waveforms of the signals output from the anode terminal and the cathode terminal of the signal have a same frequency but reverse phases. For example, the waveform 211a1 and waveform 211a2 respectively from the anode and cathode of the signal source 211a have a same frequency but reverse phases. Similarly, the waveforms 211b1 and 211b2 have a same frequency but reverse phases, and the waveforms 211c1 and 211c2 have a same frequency but reverse phases. Consequently, utilizing the different waveforms from the anode terminal and the cathode terminal of the signal sources 211a, 211b, 211c, the touched sensor 212 of each touch sensing unit 21 can be identified. For example, when the sensor 212a of the touch sensing unit 21a is touched, the diode 213a conducts and thus the waveform (e.g., 211a1) from the anode of the signal source 211a is obtained at the detector 33. Subsequently, the signal processing unit 34 compares the waveform 211a1 with the waveform (e.g., 211a0) obtained through the reference signal detector 30, and determines that the waveform 211a2 has the same frequency and phase as the waveform 211a0. The signal processing unit 34 thus identifies that the sensor 212a is touched. Alternatively, when the sensor 212b of the touch sensing unit 21a is touched, the waveform (e.g., 211a2) is obtained at the detector 33. The signal processing unit 34 compares the waveform 211a2 with the waveform (e.g., 211a0) obtained through the reference signal detector 30, and determines that the waveform 211a2 has the same frequency but a reverse phase compared with the waveform 211a0. The signal processing unit 34 thus identifies that the sensor 212b is touched.

Although the present invention has been specifically described on the basis of preferred embodiments, the invention is not to be construed as being limited thereto. Various changes or modifications may be made to the embodiments without departing from the scope and spirit of the invention.

What is claimed is:

1. A touch sensing apparatus, comprising:
   one or more touch sensing units, each touch sensing unit comprising:
   a differential signal source for generating two signals which have a same frequency but reverse phases; and
   two sensors for receiving a signal of a user's touch, wherein one sensor is connected to an anode of the differential signal source and the other sensor is connected to a cathode of the differential signal source;
   wherein, each differential signal source has an exclusive frequency;
   a detector for converting the received signal into a digital signal, wherein the sensors of all the touch sensing units are connected to an input terminal of the detector; and
   a signal processing unit for determining which sensor is touched according to a frequency and phase of the digital signal output from the detector, wherein the signal processing unit is connected to an output terminal of the detector.

2. The touch sensing apparatus as described in claim 1, wherein each touch sensing unit further comprises a first diode and a second diode, anodes of the two diodes are connected to the two sensors respectively, and cathodes of the diodes are both connected to the input terminal of the detector.

3. The touch sensing apparatus as described in claim 1, wherein the touch sensing unit further comprises a reference signal circuit for providing a reference signal for the signal processing unit to determine which sensor is touched, one end of the reference signal circuit is connected to the anode of each differential signal source, and the other end of the reference signal circuit connected to an input terminal of the signal processing unit.

4. The touch sensing apparatus as described in claim 2, further comprising a clamping circuit, the clamping circuit comprising:
   a third diode for eliminating any input static from a user's touch, wherein a cathode of the third diode connects to the cathodes of the first diode and the second diode, and an anode of the third diode is grounded; and
   a capacitor for attenuating a touch signal from the diode, wherein one end of the capacitor connects to the input terminal of the detector, and the other end of the capacitor is grounded.

5. The touch sensing apparatus as described in claim 1, wherein the sensors are shunt capacitors.

6. The touch sensing apparatus as described in claim 1, wherein the detector is a high impedance input circuit.

* * * * *

UNITED STATES PATENT AND TRADEMARK OFFICE
CERTIFICATE OF CORRECTION

| | | |
|---|---|---|
| PATENT NO. | : 7,602,383 B2 | Page 1 of 1 |
| APPLICATION NO. | : 11/307099 | |
| DATED | : October 13, 2009 | |
| INVENTOR(S) | : Hsieh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 764 days.

Signed and Sealed this

Fifth Day of October, 2010

David J. Kappos
*Director of the United States Patent and Trademark Office*